Nov. 3, 1925.
C. T. ADAIR
1,559,926
RESURFACING MACHINE
Filed Jan. 28, 1924
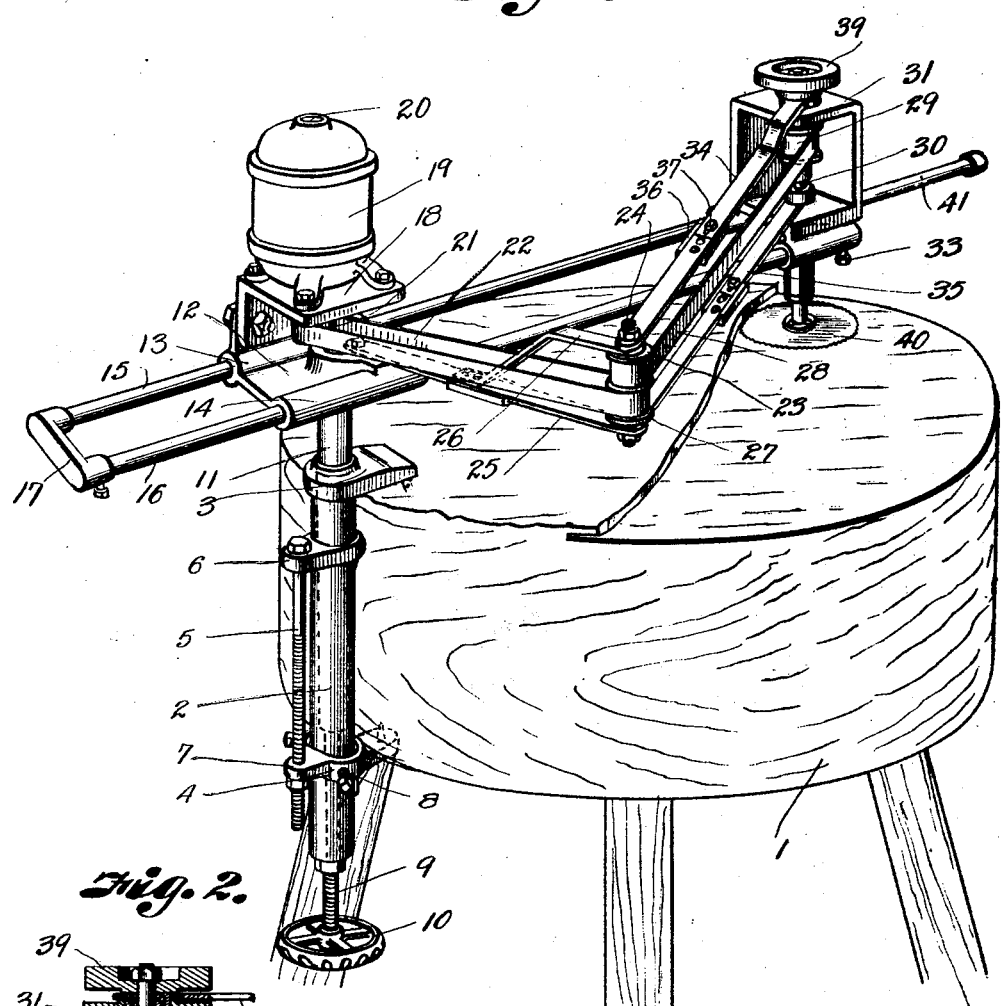
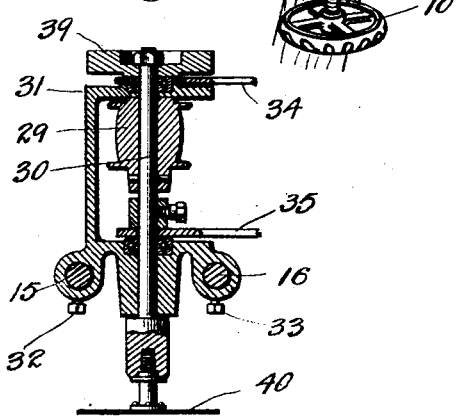
INVENTOR
Charles T. Adair.
BY
ATTORNEY Patented Nov. 3, 1925.

1,559,926

UNITED STATES PATENT OFFICE.

CHARLES T. ADAIR, OF KANSAS CITY, MISSOURI, ASSIGNOR OF ONE-HALF TO L. S. WALTER, OF KANSAS CITY, MISSOURI.

RESURFACING MACHINE.

Application filed January 28, 1924. Serial No. 688,914.

*To all whom it may concern:*

Be it known that I, CHARLES T. ADAIR, a citizen of the United States, residing at Kansas City, in the county of Jackson and State of Missouri, have invented certain new and useful Improvements in Resurfacing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to resurfacing machines and it is particularly applicable for use as a resurfacing or dressing machine for meat blocks, the primary object being to provide a novel form of device adapted to be clamped to a meat block for sawing off the used, uneven surface so as to present a smooth top to the block.

The invention consists in certain novel parts and combination of parts, all of which will be apparent by reference to the following description in connection with the accompanying drawings, in which Fig. 1 is a perspective view of a surfacing machine constructed in accordance with my invention.

Fig. 2 is a sectional view through the saw carrying head, and

Fig. 3 is a detailed perspective view of one of the belt tightener bars.

1 designates the meat block and 2 designates a tube having a rigid clamping jaw 3 at one end and an adjustable clamping jaw 4 sleeved thereon which may be adjusted on the tube or sleeve 2 by a screw 5 which extends through the lug 6 rigid on the sleeve and which passes through the lug 7 on the jaw 4, the clamping jaw 4 being held in fixed position by a set screw 8 after the jaw is adjusted. The sleeve 2 has an adjusting screw 9 extending through it and it is adapted to be turned by a hand wheel 10. The end of the screw 9 supports a swivel 11 upon which is mounted a guide head 12 having guides 13 and 14 to receive the bars 15 and 16 of a skeleton frame 17, the skeleton frame being moved longitudinally in the guides 13 and 14. The head 12 carries a bracket 18 upon which is mounted an electric motor 19, on the drive shaft 20 of which is a pulley 21 driving a belt 22 communicating motion to the pulley 27 on the shaft 24 mounted in the yoke formed by the bar 25 and the bar 26. The bar 25 is pivoted on the head 12. The shaft 24 carries another pulley 23 which drives a belt 28 passing around the pulley 29 on shaft 30 mounted in the head 31 carried by the skeleton frame 17 and fixed with relation thereto by the set screws 32 and 33.

The head 31 is held in spaced relation with the shaft 24 by belt tightener bars 34 and 35 which are extensible due to the fact that the bars are sectional and that the sections are connected by the channels 36 having bolts 37 which pass through slots 38 in one section of each bar (see Fig. 3), therefore the sectional arms can be extended to take up the slack of the belt and the outer ends of the arms are perforated so that the shaft 30 may pass through them (see Fig. 2). On the top end of the shaft 30 above the head 31 is a fly wheel 39 and at the lower end of the head is a disk saw 40. The head 31 carries a handle 41.

When the parts are clamped to the block as shown in Fig. 1 and current is supplied to the electric motor 19, it will drive the belt 22 communicating motion to the shaft 24 through the pulley 27 and since the pulley 23 is fast on shaft 24 it will be turned to communicate motion to the belt 28 driving the pulley 29 and thereby communicating motion to the shaft 30 so that the saw will be turned. The depth of the cut will be determined by the adjustment effected through the screw 9 for raising or lowering the swivel 11 and since the swivel is loose in the sleeve 2, it is obvious that the saw can be swung about the axis of the swivel to cut around the axis of the block 1 and in view of the fact that the skeleton frame 17 has free sliding movement in the head 12, it is obvious that the head 31 can be moved toward the swivel so that practically the entire surface of the block may be removed by swinging the frame 17 in an arc and sliding the block 31 on the frame, the power from the motor to the saw being communicated through the belts 22 and 28 and since the belt frame consisting of the bars 25, 26, 34 and 35 is hinged intermediate its ends, it will be apparent that the head 31 can be moved longitudinally of the frame 17 without interfering with the power transmission.

Of course that part of the top of the block engaged by the rigid jaw 3 cannot be removed along with the remaining surface at a single operation, but the small portion clamped under the jaw 3 will have to be finally removed after the clamp has been released.

What I claim and desire to secure by Letters-Patent is:

In a device of the class described, in combination with a vertically adjustable swivel and means for supporting the swivel on the work, a head pivotally mounted on the swivel, a horizontal frame slidably mounted on said head, a second head fixed on said frame, a vertical shaft revolubly mounted in said second head, a cutting tool on the lower end of said shaft, a motor on the swivel head, having a depending shaft, a bar pivotally mounted on the motor shaft, adjustable bars pivotally mounted on the tool shaft, a shaft pivotally connecting ends of the motor shaft bar and the tool shaft bars to form a hinge joint therebetween, separate pulleys on the hinge shaft, a pulley on the motor shaft, a pulley on the tool shaft, a belt connecting the pulley on the motor with one of the pulleys on the hinge shaft and a belt connecting the pulley on the tool shaft with the other pulley on the hinge shaft.

In testimony whereof I affix my signature.

CHARLES T. ADAIR.